United States Patent
Kaval et al.

(10) Patent No.: US 7,831,925 B2
(45) Date of Patent: Nov. 9, 2010

(54) METHOD FOR CONTENT-SENSITIVE RESIZING OF DISPLAY

(75) Inventors: Maria Kaval, Menlo Park, CA (US); Roderick Marcus Sloan, South San Francisco, CA (US); Karn Betrice King Choi, Seattle, WA (US); Roland J. Gonzalez, Antioch, CA (US); Travis Walters, Maple Valley, WA (US); David John George, Bellevue, WA (US)

(73) Assignee: Siebel Systems, Inc., San Mateo, CA (US)

( * ) Notice: Subject to any disclaimer, the term of this patent is extended or adjusted under 35 U.S.C. 154(b) by 761 days.

(21) Appl. No.: 10/165,740

(22) Filed: Jun. 6, 2002

(65) Prior Publication Data
US 2007/0209019 A1   Sep. 6, 2007

(51) Int. Cl.
*G06F 17/30* (2006.01)
*G06F 3/048* (2006.01)
*G06F 17/40* (2006.01)

(52) U.S. Cl. .................. 715/800; 715/246; 715/792; 715/804

(58) Field of Classification Search .......... 715/800, 715/520, 530, 759, 788, 864, 792, 798, 804, 715/805, 246
See application file for complete search history.

(56) References Cited

U.S. PATENT DOCUMENTS

| | | | | |
|---|---|---|---|---|
| 5,060,170 A * | 10/1991 | Bourgeois et al. | ........... | 715/788 |
| 5,546,520 A * | 8/1996 | Cline et al. | ............. | 715/800 |
| 5,714,971 A * | 2/1998 | Shalit et al. | ............. | 715/804 |
| 5,805,164 A * | 9/1998 | Blum et al. | ............. | 715/808 |
| 6,396,521 B1 * | 5/2002 | Lai et al. | ............. | 715/800 |
| 6,587,128 B2 * | 7/2003 | Kanevsky et al. | ........... | 715/768 |
| 6,642,945 B1 * | 11/2003 | Sharpe | ............. | 715/788 |
| 2002/0078097 A1 * | 6/2002 | Chen et al. | ............. | 707/517 |

\* cited by examiner

*Primary Examiner*—Namitha Pillai
(74) *Attorney, Agent, or Firm*—Campbell Stephenson LLP (57) ABSTRACT

A method of displaying data on a display screen is provided wherein first and second display zones are provided on the display screen. The display zones are sized so that, in combination, they substantially occupy a predetermined display area of the display screen which may, for example, be the display screen of a handheld device. In one embodiment, the relative sizes of the display zones are dynamically set dependent upon content to be displayed in each display zone. For example, a display zone for displaying list content may be larger than a display zone for displaying form content. The display zones may be arranged in a lateral fashion wherein they have substantially similar heights, or arranged in a stacked fashion with substantially similar widths. The respective widths or heights, as the case may be, may be sized dependent upon the content for display in each zone.

17 Claims, 7 Drawing Sheets

METHOD FOR CONTENT-SENSITIVE RESIZING OF DISPLAY

FIELD OF THE INVENTION

The present invention relates generally to the field of user interfaces and, more specifically, to a method and device for displaying data on a display screen. It also relates to a machine-readable medium for carrying out the method.

BACKGROUND OF THE INVENTION

Portable computing devices such as Personal Digital Assistants (PDAs), Pocket Personal Computers (PPCs), Handheld PCs (HPCs) herein generally referred to as "handheld devices" are readily available in the market place. These devices have a substantially smaller form factor than other portable computer devices such as laptop computers and, accordingly, are becoming increasingly popular. Notwithstanding, their small form factor, these handheld devices have relatively high processing capabilities and may interact with a variety of more powerful computers running sophisticated software applications accessing large databases.

However, due to their small form factor, these handheld devices include relatively small display screens. For example, certain PDAs typically include a touch display screen of 240×320 pixels, and certain so-called "handheld PCs" include a small keyboard and a display screen of 640 ×240 pixels. Bearing in mind that information displayed must be easily read by a user, such small display screens clearly create difficulties in presenting the information to the user. The information presented to the user may, in addition or instead, be in a form which defines input fields for user input e.g., via a touch screen, keyboard or the like.

For the purposes of this specification, the term "display zone" should be interpreted broadly to define so-called "windows" on a display screen, "frames" on a display screen, or the like. Thus, broadly, a display zone defines part of display real estate or available display area on a display screen.

SUMMARY OF THE INVENTION

A method and device of displaying data on a display screen is provided wherein first and second display zones are defined on the display screen. The display zones are sized so that, in combination, they substantially occupy a predetermined display area of the display screen. In one embodiment, the method comprises sizing the display zones to occupy a display area of a display screen of a handheld computer device, and dynamically sizing the relative sizes of the display zones dependent upon content to be displayed in each display zone.

Other features of the present invention will be apparent from the accompanying drawings and from the detailed description, which follows.

BRIEF DESCRIPTION OF THE DRAWINGS

The invention is illustrated by way of example, and not limitation, with reference to the accompanying drawings, in which.

DETAILED DESCRIPTION

A method and handheld device is described in which two display zones or windows are defined on a single display screen. In the following description, for purposes of explanation, numerous specific details are set forth in order to provide a thorough understanding of the present invention. It will be evident, however, to one skilled in the art that the present invention may be practiced without these specific details.

Figure 1:
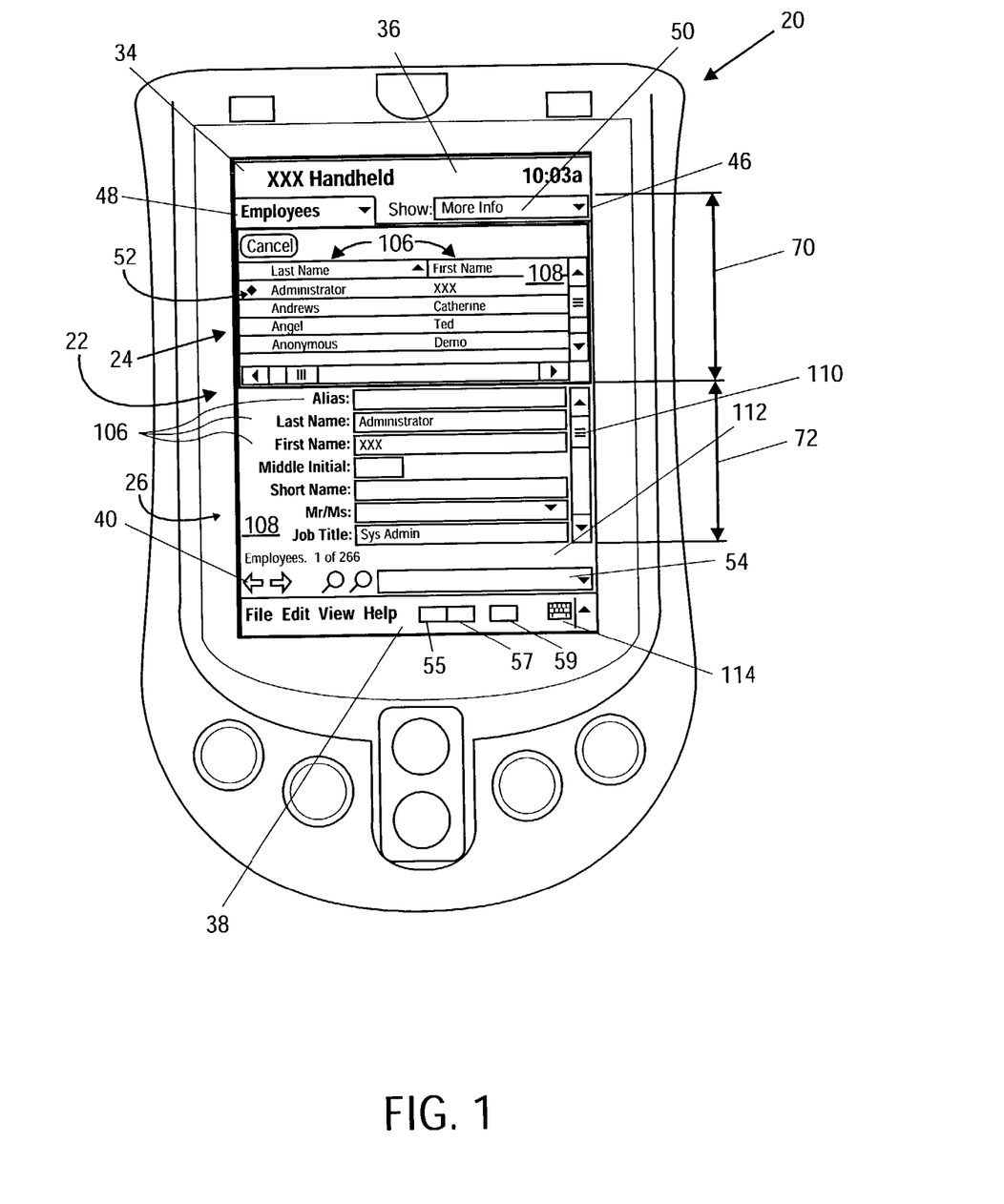
FIG. 1 shows a schematic representation of an embodiment of a handheld device comprising a display screen in accordance with an exemplary embodiment of the invention.

FIG. 1 shows an exemplary handheld computer device 20 in the form of a Pocket PC (PPC), in accordance with one aspect of the invention. The PPC 20 has a display screen 22, which includes first and second display zones or windows 24, 26 respectively. The windows 24, 26 are arranged in a stacked fashion in which the first and second windows 24, 26 are located vertically adjacent each other.

Figure 2:
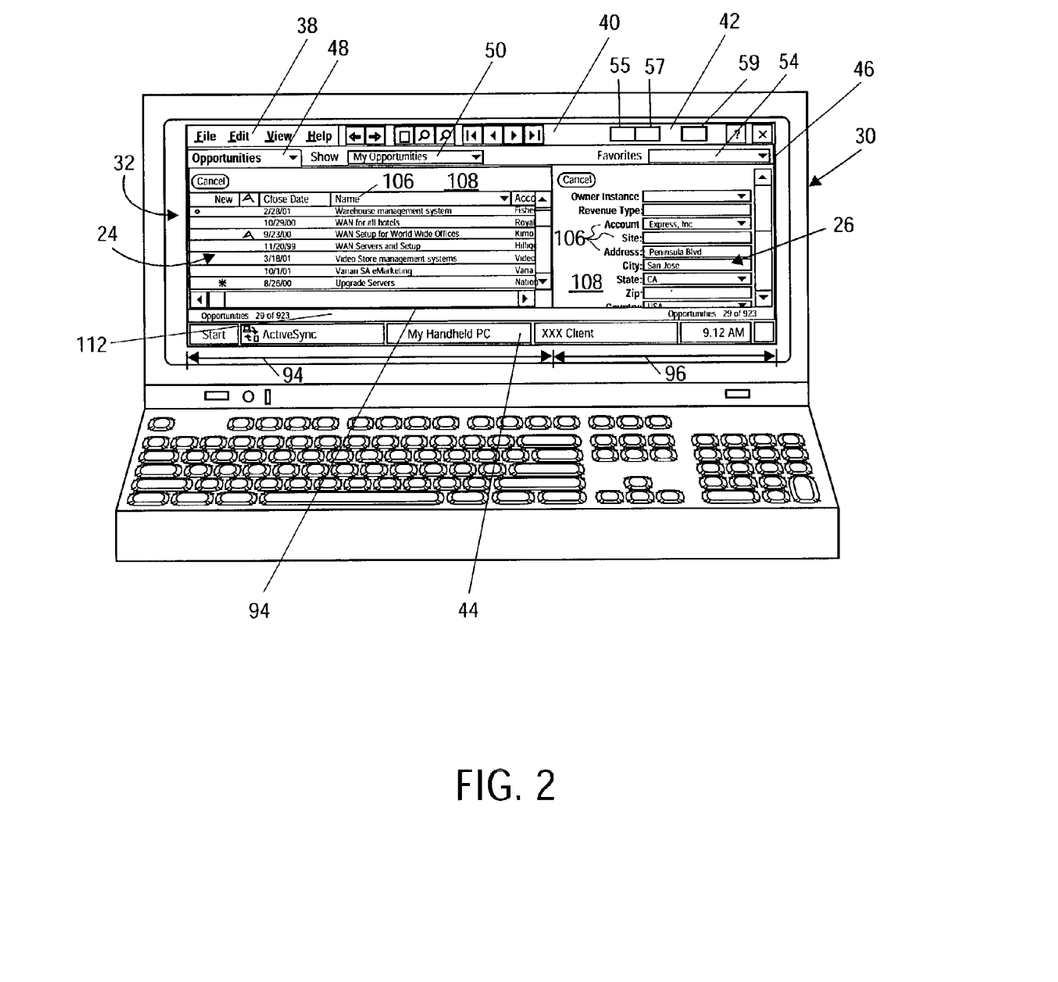
FIG. 2 shows a schematic representation of a further embodiment of a handheld device comprising a display screen in accordance with a further exemplary embodiment of the invention.

In a similar fashion, FIG. 2 shows a further exemplary handheld computer device 30 in the form of a Handheld PC (HPC), in accordance with another aspect of the invention. The HPC 30 resembles the PPC 20 and, accordingly, like reference numerals have been used to indicate the same or similar features unless otherwise indicated. However, unlike the PPC 20 which has a relatively narrow elongated display screen 22 (e.g., about 240×320 pixels), the HPC 30 has a relatively wide elongated display screen 32 (e.g., about 640× 240 pixels) and, accordingly, the first and second display windows 24, 26 of the display screen 32, of the HPC 30, are arranged laterally adjacent or in a side-by-side fashion as shown in FIG. 2.

As described in more detail below, the windows 24, 26 are dynamically sized so that, in combination, they substantially occupy a predetermined area of the display screens 22, 32. In one embodiment, the predetermined area is a predetermined maximum area. Advantageously, in the one embodiment, the predetermined maximum is the entire display real estate or view of the display screens 22, 32, which are typically LCD screens. However, in the PPC 20, substantially occupying the screen 22 may refer to that part of the screen remaining after provision is made for a Start Menu 34, a Title Bar 36, a Menu Bar 38, Toolbar Buttons 40 or the like. Likewise, in the HPC 30, substantially occupying the screen 32 may refer to that part of the screen remaining after provision is made for functionality features such as a Menu Bar 38, Toolbar Buttons 40, a Command Bar 42, a Task Bar 44, or the like. It is to be appreciated that, in other embodiments, a user may set the predetermined area of a display screen that the windows 24, 26 are dynamically sized to occupy.

Figure 3:
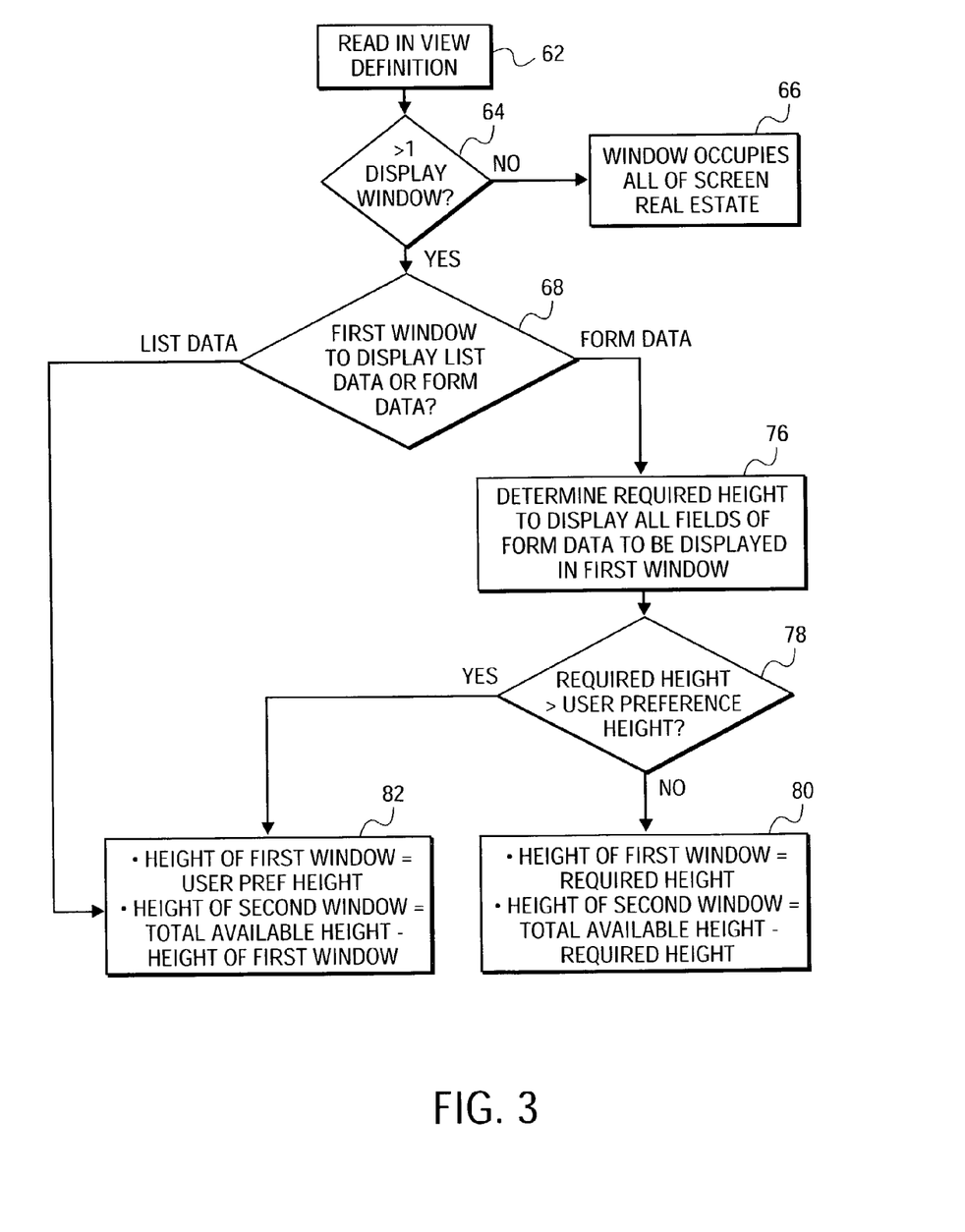
FIG. 3 shows a schematic flow chart describing sizing of the display screen of FIG. 1.

Referring in particular to FIG. 3, an exemplary flow diagram is illustrated describing a method, in accordance with an embodiment of the invention, for sizing the windows 24, 26. In one embodiment, the method described in FIG. 3 is typically used to size the windows 24, 26 on a handheld computer device such as the PPC 20 (see FIG. 1). In one embodiment, due to the shape of the display screen 22 (e.g., 240×320 pixels) of the PPC 20, the widths of the first and second widows 24, 26 are defined so that they are substantially equal and extend substantially the full width of the display screen 22. However, in one embodiment, the relative heights of the windows 24, 26 are sized, dependent on the content of each window 24, 26, so that, cumulatively or in combination, they substantially occupy the display area of the display screen 22.

When sizing the screen 22, the view or display screen definition or configuration is first ascertained as shown at block 62. In block 64, if the view definition does not require displaying more than one window, then the first window 24 may be defined so as to occupy the display area or display real estate of the display screen 22 as shown in block 66. However, if the view definition requires more than one window, then both the windows 24, 26 are dynamically sized.

In particular, in one embodiment, if more than one window is to be displayed on the display screen 22, in block 68 a check is carried out to determine the content to be displayed in the first window 24. In one embodiment, if the content of the first window 24 is list data, then the height 70 of the first window 24 is set at a user preference height and the height 72 of the second window 26 is set at the available height for the display screen 22 less the user preference height. Accordingly, the second window 26 occupies the balance of the available screen real estate not occupied by first window 24.

The first and second windows 24, 26 are dynamically sized to occupy their allotted screen real estate. In circumstances where, for example, a portion of the display screen 22 (such as the Start Menu 34, Title Bar 36, Toolbar Buttons 40, Menu Bar 38, Query Drop Down 54, or the like) are displayed independently of the windows 24, 26, the windows 24, 26 are sized to occupy substantially the remaining screen real estate after provision has been made for the portion. However, if these portions form part of the windows 24, 26, then the windows 24, 26 are sized to occupy the display screen 22.

Returning to block 68, when the first window 24 is to display content such as form data, then in block 76 a required height needed to display all fields of the selected content is determined. In block 78, if the required height does not exceed the user preference height, then in block 80 the height 70 of the first window 24 is set to the required height and the height of the second window 26 is set at a height 72 equal to the total available height less the required height. However, if the required height exceeds the user preference height, or the first window 24 is to display content in the form of list data, in block 82 the height 70 of the first window 24 is set at a height equal to the user preference height, and the height of the second window 26 is set at a height 72 equal to the total available height less the required height.

Figure 4:
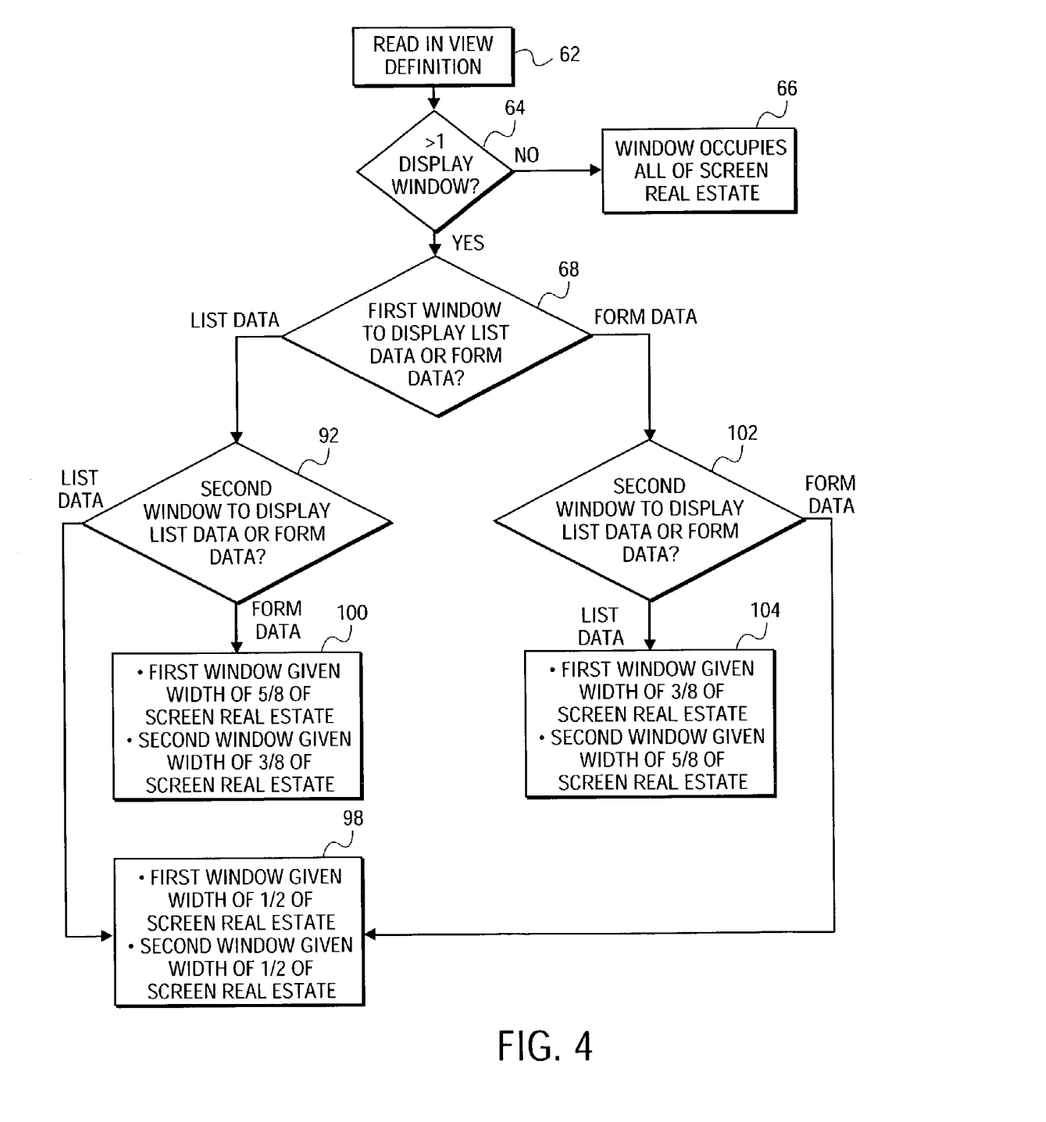
FIG. 4 shows a schematic flow chart describing sizing of the display screen of FIG. 2.

Whereas in the display screen 22 of FIG. 1, the height of the two windows 24, 26 is sized, in the display screen 32 of FIG. 2 the width of the two windows 24, 26 is sized. Referring in particular to FIG. 4, a flow diagram is illustrated describing an exemplary method, in accordance with a further embodiment of the invention, for sizing the windows 24, 26. In one embodiment, the method described in the flow diagram of FIG. 4 is typically used to size the windows 24, 26 on a handheld computer device such as the HPC 30 (see FIG. 2). Due to the shape of the display screen 32 (e.g., 640×240 pixels) of the HPC 30, heights of the first and second widows 24, 26 are defined so that they are substantially equal and extend substantially the full height of the display screen 32. However, the relative widths of the windows 24, 26 are sized, dependent on the content of each window 24, 26, so that cumulatively or in combination they substantially occupy the display screen 22. Certain functionality carried out in the flow diagram of FIG. 3 is also carried out in the flow diagram of FIG. 4 and, accordingly, like reference numerals are used to indicate similar blocks.

As in the case of the screen 22 of FIG. 1, when sizing the screen 32 of FIG. 2, the required display screen definition or configuration is first ascertained as shown at block 62. In block 64, if the view definition does not require displaying more than one window, then the first window 24 is defined so as to occupy the display area or display real estate of the display screen 32 as shown in block 66. However, if the view definition requires more than one window, then both the windows 24, 26 are dynamically sized.

In particular, if more than one window is to be displayed on the display screen 32, in block 68 a check is carried out to determine the content to be displayed in the first window 24. If the content of the first window 24 is list data, then the sizing of the windows 24, 26 is dependent upon the content to be displayed in the second window 26.

In block 92, if the content of the first window 24 is list data, then a check is conducted to determine the content of the second window 26. If the content of the second window 26 is also list data, then the first and second windows are each set at a width equal to about half of the available width of the display screen 32 as shown in block 98. However, returning to block 92, when the content of the second window 26 is form data, in one embodiment a width 94 of the first window 24 is set at about five-eighths (⅝) of the total available width of the display screen 32, and a width 96 of the second window 26 is set about three-eights (⅜) of the available width for the display screen 32, as shown in block 100. Accordingly, the second window 26 occupies the balance of the available screen real estate not occupied by first window 24. As discussed above with reference to the display screen 22, the first and second windows 24, 26 are dynamically sized to occupy their allotted screen real estate. Further, in one embodiment, the total amount of screen real estate occupied is dependent upon whether or not control features such as task bars or the like are provided independently of the windows 24, 26.

Returning to block 68, when the first window 24 is to display form data, then in block 102 a check is conducted to determine the content of the second window 26. If the content of the second window 26 is form data, then the first and second windows 24, 26 are each set at a width equal to about half of the available width (the correct widths for this configuration are not shown in FIG. 2) of the display screen 32 as shown in block 98. However, if the content of the second window is list data, then in one embodiment the width 94 of the first window 24 is set at about three-eighths (⅜) of the total available width of the display screen 32, and the width of the second window 26 is set at width 96 equal to about five-eights (⅝) of the available width for the display screen 32 as shown in block 104.

In the embodiment discussed above, certain specific widths have been mentioned. However, it should be appreciated that the widths (see FIG. 2) of the window 24, 26, for the various combinations of list and form windows, are provided by way of example. Accordingly, in other embodiments, the widths may vary without departing from the invention. Likewise, the heights of the windows 24, 26 in FIG. 1, for the various combinations of list and form windows, are also provided by way of example and may also vary without departing from the invention.

In addition to dynamically sizing the first and second windows 24, 26, as shown in FIG. 1 and FIG. 2, each window 24, 26 has labels 106 that are provided in fields 108 that are also dynamically sized.

In particular, in one embodiment, prior to defining the width allocated to the fields 108, the labels 106 to be displayed in the fields 108 are read to determine a required label length needed if all the labels are to be displayed properly, in a particular field, with their full text. Circumstances may arise when the labels 106 are too long to be conveniently displayed and, accordingly, a default label length for the fields is set at about a ½ of the total width of the particular window 24, 26. In one embodiment, the required label length of the labels 106 (e.g. the length of the longest label) is then compared to the default label length. If the default label length exceeds the required label length, then the width of the field is typically set at the required label length. However, if the required label length exceeds the default label length in a form window, then a width of the field 108 is set as the default label length and the label 106 in the field 108 is truncated. In one embodiment, ellipses are appended to indicate the truncation to a user.

In one embodiment, the PPC 20 illustrated in FIG. 1 controls are laid out in a vertical line and a vertical scroll bar 110 is added if needed. A horizontal scroll bar is generally not required, as the control width is set to not extend past the width of the window 26. It is to be appreciated that, in other embodiments, the default label length for the fields may be set at a user preference width. A status bar 112 is provided on both the display screens 22 and 32 to give information about the particular window with which it is associated.

In one embodiment, a user of the PPC 20 and HPC 30 (also referred to as "the devices 20, 30") can navigate in a variety of ways between different screen views provided by their operating applications. A brief description of exemplary navigation functionality of the devices 20, 30 is set out below.

Firstly, referring back to FIGS. 1 and 2, the user can select a screen from a Screen Drop Down 48 on a Navigation Bar 46, which takes the user to a default view in the particular screen, as defined, for example in a Tools facility. When the user selects a new screen from the Screen Drop Down 48, the user is taken to the first record that applies to the query of the view that he or she navigates to.

Secondly, the user can also choose to navigate to a different view in the current screen by selecting a view from a View Drop Down 50 on the Navigation Bar 46, which is shown in FIGS. 1 and 2. When the user navigates by using the View Drop Down 50, the current record is remembered unlike in the case of the Screen Drop Down 48, where the data or information is overwritten on the screen.

Thirdly, in one embodiment the user can click on a record in a list window (for example the "Administrator" record 52 in the first window 24 in FIG. 1) to drill down, whereupon the user is then automatically taken to a different view. In a similar fashion to the View Drop Down 50, when the user drills down, the content of the current record from a display point of view is retained.

A fourth way to navigate to a view, in one embodiment, is to use the find dialog or Query Drop Down 54. When the user initiates a find on a given screen, he is taken to the default view within that screen.

The user can also navigate to a given view by selecting drill down buttons configured for the particular window. Drill down buttons function like the drill downs available on list windows and, therefore, remember the content of the previous display screen.

In one embodiment, the Screen Drop Down 48 lists the names of the available screens in the application. When the user selects a screen name, such as the "Employees" screen shown in FIG. 1 or the "Opportunities" screen shown in FIG. 2, the default view for that screen is built providing default first and second windows 24,26 associated with the selected screen, and a default query dialog is also applied to the view. The View Drop Down 50 then lists all views available within the particular screen.

Instead of viewing the two windows 24, 26 simultaneously, the user may select one of the windows 24, 26 to occupy the display screen or view by activating a maximize or enlarge button/key 55 shown in FIGS. 1 and 2. In one embodiment, in response to activation of the enlarge button 55, a selected first or second window 24, 26 may be sized from a first size to a second size substantially occupying the display area of the display screens 22, 32. Upon activation of a reduce or minimize button/key 57, the selected first or second window 24, 26 may be sized from the second size to the first size. Accordingly, the selected window 24, 26 may revert to the size that it was prior to activation of the maximize button 55. In one embodiment, the single window 24 or 26 generally provides more information or detail to the user. However, when both the first and second windows 24, 26 are displayed, in one embodiment they may be arranged in a parent-child or primary-secondary fashion. In these circumstances, the first window 24 may be sized to show list data or content and the second window 26 is sized to show form data or content associated with a record in the list data displayed in the first window 24 (e.g., see display screen 22 in FIG. 1). However, it is to be appreciated that the data displayed in the first and second windows 24, 26 need not necessarily be related and that either window may display form or list data or content.

In one embodiment, the windows 24, 26 typically display list and form data (as shown in FIGS. 1 and 2). A window 24, 26 showing list data (also referred to herein as a list window) allows the user to see a list of records at once, and a window 24, 26 showing form data (also referred to herein as a form window) typically relates to a single record. In one embodiment, the list window provides output fields for displaying lists of records without input fields, and the form window provides both output fields to display data as well as input fields via which a user may enter data. It is to be appreciated that the fields displayed in a form window need not necessarily be the same as the fields displayed in a corresponding list window for a particular business component. The display screens 22, 32 may also display popup windows (see FIGS. 5-8) as described in more detail below. Popup windows generally allow the user to pick a record from a list.

As mentioned above, in one embodiment, the devices 20, 30 allow two windows 24, 26 to be displayed simultaneously, or a single window 24, 26 can take up or occupy the display real estate. In the embodiment depicted in FIGS. 1 and 2, in order to replace the view or screen in a particular window 24, 26, with another view or screen including currently non-displayed content, a toggle button 59 is provided. In use, the user can thus toggle between different views or screens provided in a particular window 24, 26, using, for example, a cascading toggle menu item. Typically, this functionality is provided for the second window 26 allowing a user to view a number of different screens or views which are then displayed one at a time in the second window 26. As the content displayed in the second window 26 is changed, the first window 24 typically remains unchanged during the toggle operation. The windows 24, 26 are dynamically sized dependent upon the type of data to be displayed in the windows.

Figure 5:
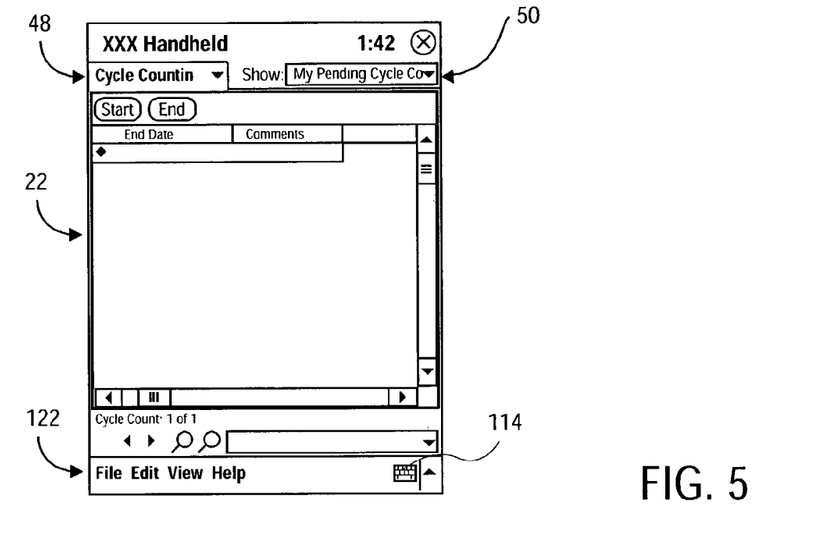
FIG. 5 shows a schematic representation of a single list window displayed on the display screen of FIG. 1.

Examples of user interaction to perform variety of operations, by means of the user interfaces or display screens 22, 32, are now described in more detail. In particular, in one embodiment, when the user interface application on the handheld devices 20, 30 is started, a start up view or window is built if one has already been predefined. As illustrated in FIG. 5, a single window is shown without any content that may be presented to the user upon start up. In order to navigate to a particular view, the user may click on the Screen Drop Down 48 and a default window, which may, for example be similar to the window 24 of FIGS. 1 and 2, may be displayed. Within this window 24, the user can then add, modify, delete and query on records displayed in the window 24, as allowed by the configuration. To navigate to a different view, within the same window 24, the user may select the name of the view from the View Drop Down 50. The user knows where he is in the application since the Screen and View Drop Downs 48, 50, respectively, identify the view or content that the user is currently viewing. If the user clicks on a window 24 within the view to activate it, or if there are more than two windows in the view, the user can use the cascading toggle menu item (as described above) to have different views or content displayed in a particular window 24, 26.

Figure 6:
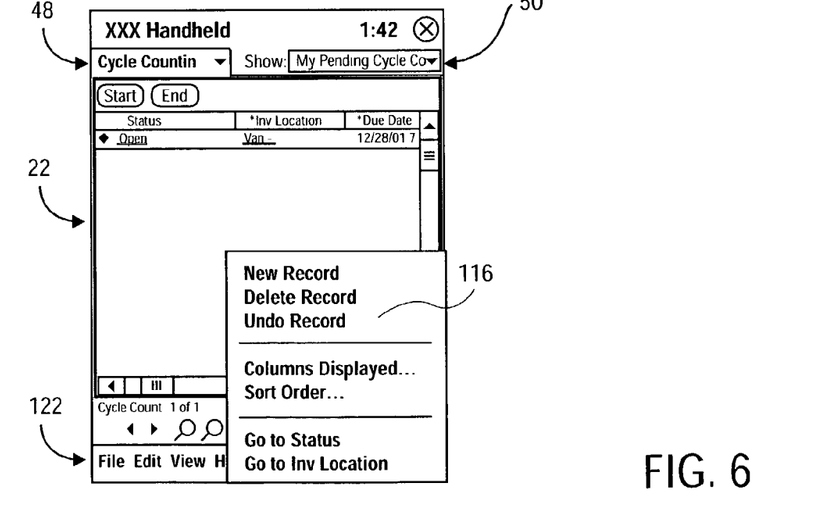
FIG. 6 shows a schematic representation of a popup window on the single list window of FIG. 5.
Figure 7:
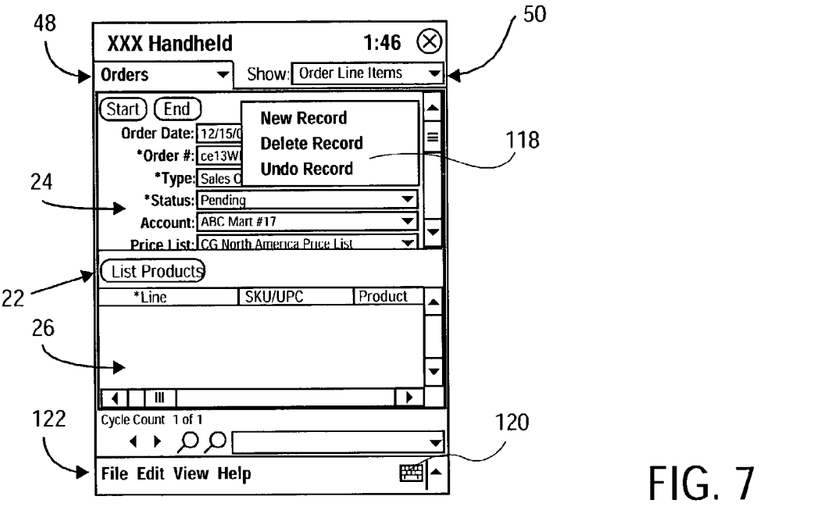
FIG. 7 shows a schematic representation of a form window displayed above a list window, on the display screen of FIG. 1.

In one embodiment, the exemplary handheld PPC 20 also provides popup menu functionality. However, when following Windows CE™ guidelines, the HPC 30 typically does not provide popup functionality. Regarding the popup menus on the PPC 20, in one embodiment a popup menu key 114 as shown in FIGS. 1 and 5, which is associated with list content displayed in the second window 26, is provided at a bottom right side of the display screen 22. As illustrated in FIG. 6, when the user clicks and holds the popup key 114 with a stylus, a popup menu 116 is provided. In a similar fashion, as illustrated in FIG. 7, a popup menu 118 may be generated in response to a popup key 120 associated with form content displayed in the first window 24. The popup menu 116 typically includes items such as New Record/Delete Record/Undo Record etc. The content of the popup windows 116, 118 can differ dependent on the particular application being run on the PPC 20. The items listed in the popup menu 116, 118 also provide drill down functionality.

Figure 8:
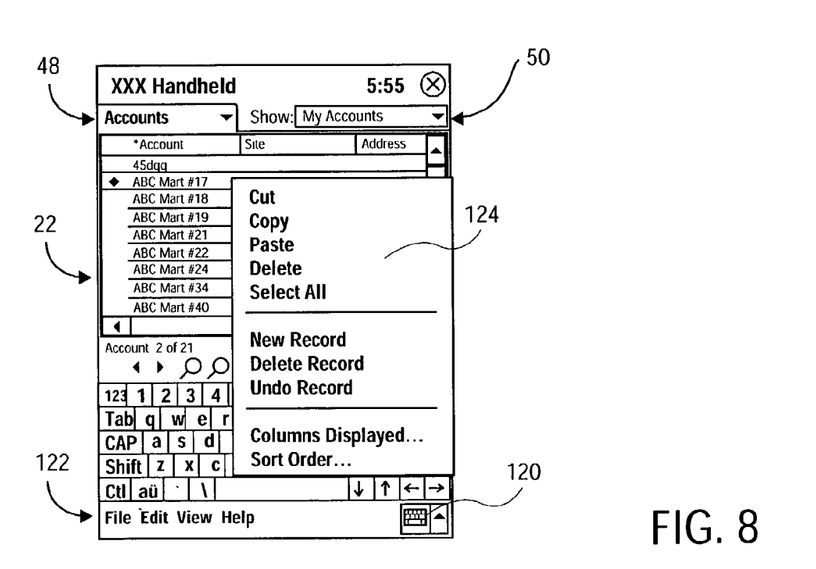
FIG. 8 shows a schematic representation of a popup window on the single list window.

In an alternative embodiment, as illustrated in FIG. 8, activation of controls 122 associated with form and list windows also generate a popup menu 124 that includes items such as Cut/Copy/Paste etc., as well as the menu items provided in the popup menu 118 associated with a window 24,26.

Typically, when the user activates the maximize/minimize button on the HPC 30, then the second window is maximized, and on the PPC 20 the active window is maximized. It is to be appreciated that the maximize/minimize logic may differ from application to application.

An application or system administrator utility of the devices 20, 30 may control the generation of the windows 24, 26 thereby to configure the devices 20, 30 to suit a particular customer. However, it is important to appreciate that the features typically differ from customer to customer.

From an application architecture point of view, in one embodiment the devices 20, 30 have an application layer, a user interface layer, an object manager layer, a data management layer, and a database layer. It is the user interface layer that renders the display and interacts with the user's actions and, accordingly, the method herein described is typically carried out at this level. A frame manager typically renders the application user interface, including the windows 24, 26.

It will be appreciated by a person skilled in the art that the actual software code to dynamically size the first and second windows 24, 26 is purely a matter of design choice and may be carried out in a variety of different ways. Further, it is to be appreciated that the resolution of the display screens 22, 32 may vary from one embodiment to another. The resolutions of 240×320 for the device 20, and 640×240 for the device 30 are provided by way example.

Figure 9:
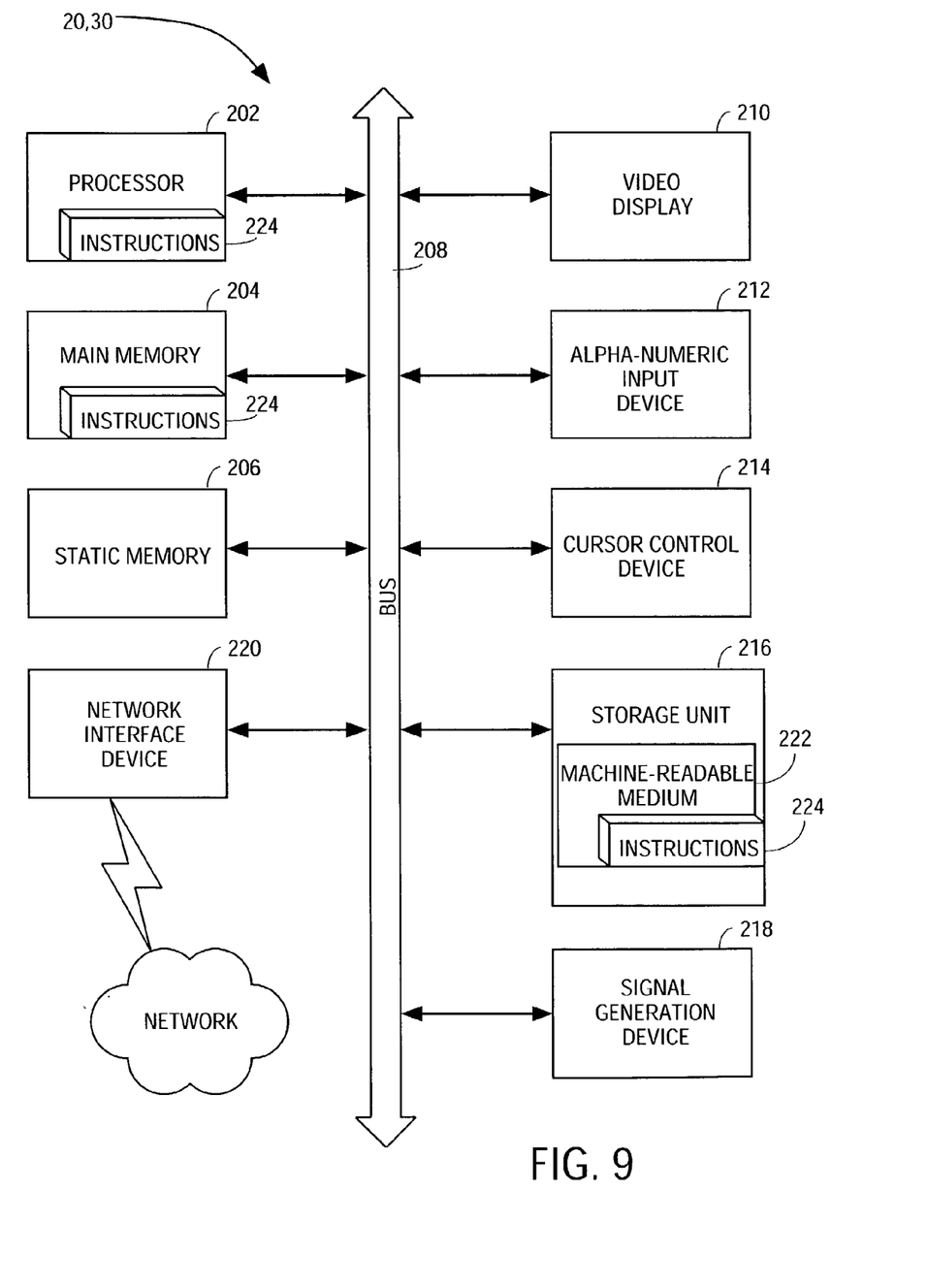
FIG. 9 shows an exemplary hardware block diagram for the handheld devices.

FIG. 9 shows a diagrammatic representation of machine in the exemplary form of the handheld computer devices, 20, 30, within which a set of instructions, for causing the machine to perform any one of the methodologies discussed above, may be executed.

The devices 20, 30 include a processor 202, a main memory 204, and a static memory 206, which communicate with each other via a bus 208. The devices 20,30 further include a display unit 210 (e.g., a liquid crystal display (LCD) with a display screens 22, 32). The devices 20, 30 also include an alphanumeric input device 212 (e.g. a keyboard or touch screen), a cursor control device 214 (e.g. a mouse), a signal generation device 218 (e.g. a speaker), a network interface device 220, and optionally also include an add-on storage unit 216.

The add-on storage unit may define a machine-readable medium 222 in which is stored a set of instructions or applications 224 embodying any one, or all, of the methodologies described above. However, the applications 224 typically reside within the main memory 204 and/or within the processor 202. The applications 224 may further be transmitted or received via the network interface device 220. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical disks and magnetic disks.

Thus, method and device have been described in which two display zones or windows are defined on a single display screen. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense. For example, the dynamic sizing of the two windows 24, 26 may be applied equally to a display screen of other computing devices such as a laptop computer or desktop PC.

What is claimed is:

1. A method of displaying data on a display screen, the method comprising:

sizing a first display zone to be equal in size to a second display zone if the first and second display zones both display lists of database records;

sizing the first display zone to be greater in size when compared to the second display zone if the first display zone displays a list of database records and the second display zone displays a database record from the list of database records; and wherein the displayed database record, but not the displayed list of database records, comprises a field into which a user can enter an item of data, and when the first display zone displays the list of database records and the second display zone displays the database record from the list, the method further comprises determining a required height of the first display zone to accommodate the list of database records to be displayed in the first display zone, comparing the required height with a reference height, sizing the first display zone to the reference height when the required height exceeds the reference height, sizing the first display zone to the required height when the reference height exceeds the required height, and sizing the second display zone to occupy substantially a remaining display area of the display screen.

2. The method of claim 1, further comprising an act of concurrently displaying the first and second display zones on the display screen after the first and second display zones have been sized, wherein the first and second display zones, when displayed, substantially occupy a predetermined display area of the display screen.

3. The method of claim 1, further comprising an act of sizing the first and second display zones to occupy a predetermined display area of the display screen on a handheld computer device.

4. The method of claim 1, further comprising:

displaying the first and second display zones laterally adjacent to each other on the display screen;

sizing the first and second display zones to have substantially similar heights when displayed.

5. The method of claim 4, further comprising providing a scroll bar to scroll content in the first display zone when the required height exceeds the reference height.

6. The method of claim 1, further comprising:

displaying the first and second display zones vertically relative to each other on the display screen;

sizing the first and second display zones to have substantially similar widths when displayed.

7. The method of claim 1, further comprising:

enlarging the first display zone when displayed from a first size to a second size, in response to activation of an enlarge button, the second size substantially occupying the display area; and reducing, in response to activation of a reduce button, the displayed first display zone from the second size to the first size.

8. The method of claim 1, further comprising toggling, in response to activation of a toggle button, between content displayed in one of the first and second display zones and non-displayed content.

9. The method of claim 1, wherein at least one of the first and second display zones further comprises a plurality of fields that are dynamically sized.

10. The method of claim 9, further comprising:

determining a required label length of a label to be displayed in one of the plurality of fields;

comparing the required label length with a default label length; and setting a width of the one of the plurality of fields to a default width when the required label length exceeds the default label length.

11. The method of claim 10, further comprising truncating any label with a length exceeding the default label length.

12. The method of claim 1, wherein the predetermined display area is the display area less zones for displaying functionality features.

13. A method of displaying data on a display screen, the method comprising:

sizing a first display zone to be greater in size when compared to a second display zone;

concurrently displaying the first and second display zones on a display screen after the first and second display zones have been sized, wherein the first and second display zones substantially occupy a predetermined display area of the display screen;

wherein the first display zone displays a list of database records and the second display zone displays a database record from the list of database records;

wherein the displayed database record, but not the displayed list of database records, comprises a field into which a user can enter an item of data;

displaying the first and second display zones vertically relative to each other on the display screen;

sizing the first and second display zones to have substantially similar widths when displayed;

determining a required height of the first display zone to accommodate the list of database records to be displayed in the first display zone;

comparing the required height with a reference height;

sizing the first display zone to the reference height when the required height exceeds the reference height and, sizing the first display zone to the required height when the reference height exceeds the required height; and sizing the second display zone to occupy substantially the remaining display area of the display screen.

14. A computer readable memory that stores instructions that implement a method when executed, the method comprising:

sizing a first display zone to be greater in size when compared to a second display zone;

concurrently displaying the first and second display zones on a display screen after the first and second display zones have been sized, wherein the first and second display zones substantially occupy a predetermined display area of the display screen;

wherein the first display zone displays a list of database records and the second display zone displays a database record from the list of database records;

wherein the displayed database record, but not the displayed list of database records, comprises a field into which a user can enter data;

determining a required height of the first display zone to accommodate the list of database records to be displayed in the first display zone;

comparing the required height with a reference height;

sizing the first display zone to the reference height when the required height exceeds the reference height and, sizing the first display zone to the required height when the reference height exceeds the required height; and sizing the second display zone to occupy substantially the remaining display area of the display screen.

15. The computer readable memory of claim 14, the method further comprising:

displaying the first and second display zones laterally adjacent to each other on the display screen;

sizing the first and second display zones to have substantially similar heights when displayed.

16. The computer readable memory of claim 14, the method further comprising:

displaying the first and second display zones vertically relative to each other on the display screen;

sizing the first and second display zones to have substantially similar widths when displayed.

17. The computer readable memory of claim 14, the method further comprising an act of providing a scroll bar to scroll content in the first display zone when the required height exceeds the reference height.

* * * * *